UNITED STATES PATENT OFFICE.

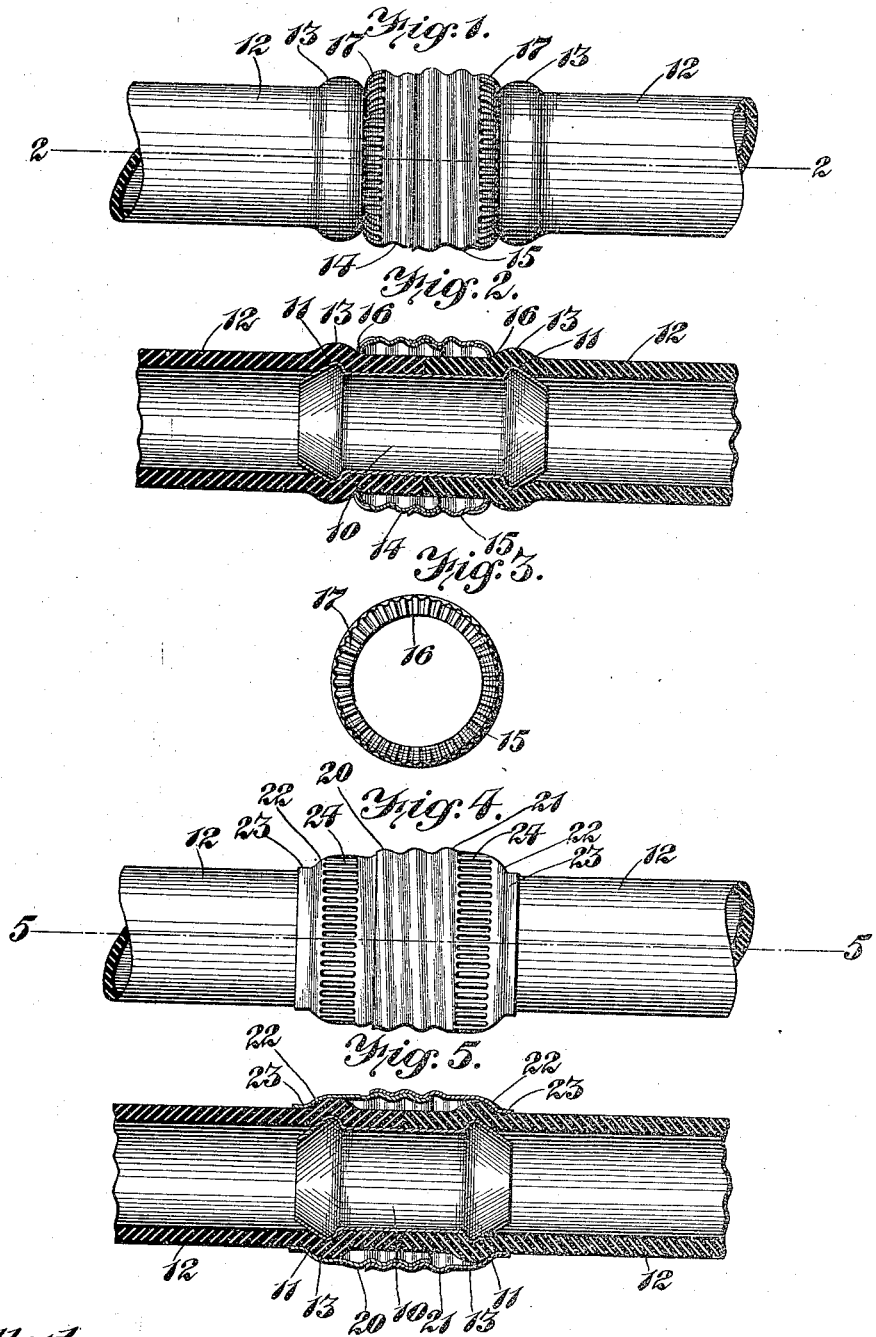

FREDERICK HACHMANN, OF ST. LOUIS, MISSOURI, ASSIGNOR OF ONE-FOURTH TO FRED C. SCHOENTHALER, OF ST. LOUIS, MISSOURI.

HOSE-COUPLING.

1,195,581.      Specification of Letters Patent.      Patented Aug. 22, 1916.

Application filed September 18, 1914. Serial No. 862,305.

*To all whom it may concern:*

Be it known that I, FREDERICK HACHMANN, a citizen of the United States, and residing at St. Louis, in the State of Missouri, have invented certain new and useful Improvements in Hose-Couplings, of which the following is a specification.

This invention relates to hose couplings, and more particularly, to hose menders for rubber or other flexible hose.

Some of the objects of this invention are, to provide a hose coupling which is simple in construction and operation, effective in its action, which consists of a few parts, and is cheap to manufacture.

Further objects will appear from the detail description taken in connection with the accompanying drawing, in which:

Figure 1 is an elevation of a coupling joining two sections of hose; Fig. 2 is a section on the line 2—2, Fig. 1; Fig. 3 is a detail end elevation of one of the sleeves; Fig. 4 is a view similar to Fig. 1, but showing another embodiment of this invention; and, Fig. 5 is a section on the line 5—5, Fig. 4.

Referring to the accompanying drawing, and more particularly, to Figs. 1 to 3 inclusive, 10 designates a nipple having annular enlargements or shoulders 11 at its ends, the ends of the nipple being tapered to permit their ready insertion into the ends of the hose sections 12. The shoulders 11 form annular enlargements 13 on the hose sections. A pair of clamping sleeves 14, 15, are formed with coöperating threads, so that one will thread or telescope within the other. Each sleeve is provided with an inwardly projecting flange 16, which is preferably corrugated radially of the flange and continued along the sleeve body, as shown at 17, to facilitate turning thereof. The internal diameter of the hole in the flange is slightly larger than the outside diameter of the hose, so that the sleeve may be readily slipped over the hose. The sleeves, as well as the nipple, are preferably constructed of sheet metal and formed by means of suitable dies. To apply the device to hose sections, the nipple is first slipped half-way into one of the sections. The sleeves are then screwed together, so as to collapse one within the other, and slipped on the hose section containing the nipple, so as to cause the flange to abut against the enlargement 13 on the hose section. This will position the other flange some distance from the shoulder 11 on the protruding part of the nipple, and permits the other hose section to be slipped onto the nipple and into the sleeve until it abuts against the other hose section. The clamping sleeves are now turned relatively so as to move them apart or outwardly, and this will cause the corrugated flanges to bear against the inside faces of the enlargements and firmly clamp the hose against the inside faces of the shoulders 11. This will firmly clamp the hose sections together, so that they cannot be separated. Since the flanges are corrugated, these corrugations will sink into the hose, without cutting, and firmly grip the same so as to firmly clamp the hose sections to the nipple. To remove the hose, the operations are reversed.

In the construction shown in Figs. 4 and 5, the sleeves 20 and 21 are made longer than the corresponding sleeves shown in Figs. 1 and 2, and the flanges 22 are, in this case, formed at obtuse angles to the sleeves, and are provided with portions 23 which extend along the hose sections, and have internal diameters slightly larger than the hose sections. The sleeves are also corrugated, as shown at 24. In applying this hose coupling, the clamping sleeves 20 and 21 are first slipped over the ends of the hose for some distance back, and the nipple 10 is then inserted into the ends to be joined. The sleeves are now brought together and screwed up tight, and this will cause the clamping shoulders 22 to bear against the annular enlargements 13 and clamp the hose against the annular shoulders 11, so as to form a tight joint. The coupling thus constructed forms a water, air and steam tight joint, since the hose forms its own gasket. Moreover, the application of this coupling does not tear or otherwise damage the hose, since the joint is made by shoulders which merely clamp the hose therebetween. The device is, furthermore, simple in construction, as well as operation, and this result is obtained by constructing the clamping means surrounding the hose, so that they are self-contained and make no direct connection with the nipple itself. This construction, therefore, permits the nipple, as well as the clamping means, to be given a simple construction, and permits them to be manufactured cheaply. Moreover, since the nipple is entirely separate from the clamping means, this nipple can be made of a non-corrosive material, while the clamping means, which are external and entirely out of contact with the nipple or the inside of the hose, may be made of any suitable cheap material.

Both embodiments have their advantages, but the embodiment shown in Figs. 1, 2 and 3 is cheaper to construct, since it will require less material for the outside sleeves. Moreover, the corrugated flanges on the clamping sleeves will give a very firm clamping action.

It is obvious that various changes may be made in details of construction without departing from the spirit of this invention, and it is, therefore, to be understood that this invention is not to be limited to the specific construction shown and described.

Having thus described the invention, what is claimed is:

1. A hose mender comprising a nipple formed from a pressed metal blank expanded adjacent its ends to provide annular ribs shaped to present inner abrupt shoulders and outer faces taperingly inclined to the terminals of the nipple, said ribs being adapted, when the nipple is inserted in the hose sections, to expand said sections at points remote from their meeting ends, and a pair of pressed metal sleeves adapted to be applied over the hose and having abruptly inturned end flanges disposed to apply an outward pressure against, and coact with the inner shoulders of said ribs to clamp the expanded portions of the hose, said sleeves being free from contact with the hose except at said clamping points and having pressed threads forming a yieldable connection between the sleeves adapting them to yieldingly clamp the hose.

2. A hose coupling comprising a nipple formed from a pressed metal blank expanded to provide an annular rib adjacent one end of the nipple and adapted when the latter is inserted into the hose section to expand said section at a point remote from its coupled end, a pressed metal coupling sleeve adapted to pass over the hose and having an abrupt serrated annular flange coöperating with said rib to clamp the expanded portion of the hose, and a second pressed metal coupling sleeve having threaded engagement with the first named sleeve and surrounding the hose section end.

3. A hose mender comprising a nipple formed from a pressed metal blank expanded to provide annular ribs adjacent the ends of said nipple and adapted when the latter is inserted into the hose sections to expand said sections at points remote from their meeting ends, and a pair of pressed metal coupling sleeves threaded for coöperative engagement and adapted to be applied to the hose, said sleeves having abrupt annular serrated flanges coacting respectively with said ribs to clamp the expanded portions of the hose sections.

In testimony whereof I affix my signature in the presence of these two witnesses.

FREDERICK HACHMANN.

Witnesses:
FRANK MESHIKIE,
ALOYSIA MORKEN.

Copies of this patent may be obtained for five cents each, by addressing the "Commissioner of Patents, Washington, D. C."